(12) United States Patent
Shinjo

(10) Patent No.: US 8,288,676 B2
(45) Date of Patent: Oct. 16, 2012

(54) NUT SUPPLY APPARATUS TO BONDING MACHINE

(75) Inventor: Hiroshi Shinjo, Osaka (JP)

(73) Assignee: Shinjo Manufacturing Co., Ltd., Osaka (JP)

( * ) Notice: Subject to any disclaimer, the term of this patent is extended or adjusted under 35 U.S.C. 154(b) by 303 days.

(21) Appl. No.: 12/815,795

(22) Filed: Jun. 15, 2010

(65) Prior Publication Data

US 2010/0314359 A1   Dec. 16, 2010

(30) Foreign Application Priority Data

Jun. 15, 2009  (JP) ................................. 2009-141838

(51) Int. Cl.
| | |
|---|---|
| *B23K 11/00* | (2006.01) |
| *B23K 1/00* | (2006.01) |
| *B23K 1/015* | (2006.01) |
| *B23K 11/24* | (2006.01) |
| *B23K 3/00* | (2006.01) |
| *B23K 3/04* | (2006.01) |
| *B23K 31/02* | (2006.01) |
| *B23K 9/12* | (2006.01) |
| *B23K 9/28* | (2006.01) |
| *B23K 9/32* | (2006.01) |
| *B23K 37/02* | (2006.01) |

(52) U.S. Cl. ................ 219/78.01; 219/85.14; 219/85.19; 219/80; 219/86.1; 219/86.24; 219/86.25; 219/86.7

(58) Field of Classification Search ............... 219/78.01, 219/85.14, 85.19, 80, 86.1, 86.24, 86.25, 219/86.7

See application file for complete search history.

*Primary Examiner* — David Zarneke

(74) *Attorney, Agent, or Firm* — Antonelli, Terry, Stout & Kraus, LLP.

(57) ABSTRACT

A supply chute 11 has a nut send-in port 14 at its upper end, and is composed of an inclined chute 12 inclined obliquely downward, and a curved chute 13 coupled to the lower end of the inclined chute 12 and curved like an arc obliquely downward. A nut support mechanism 40 is disposed at a nut send-out port 15 provided at a terminal end of the curved chute 13, for supporting the nuts 60 being forwarded so that their bonding side 62 may be in an oblique downward position nearly orthogonal to the axial line of a guide rod 20. The inclined chute 12, the curved chute 13, the guide rod 20, and driving means 25 for moving the guide rod 20 back and forth in an oblique downward direction are mounted on a stand 22 installed rotatably on a support member 33 by way of a horizontal support shaft 35, and the support member 33 is coupled and fixed to a main body arm 2 of the bonding machine 1. When the guide rod 20 moves forward obliquely downward, the holding pin 21 protruded on the front end of the guide rod 20 penetrates through screw holes 61 of the nuts 60 supported on the support mechanism 40, and pieces through and holds, and the leading end of the holding pin 21 approaches and moves to the leading end of a positioning pin 5, and the screw holes 61 of the nuts 60 held on the holding pin 21 are supplied in fitting with the positioning pin 5.

7 Claims, 9 Drawing Sheets

NUT SUPPLY APPARATUS TO BONDING MACHINE

TECHNICAL FIELD

The present invention relates to a nut supply apparatus to a bonding machine for supplying welding nuts and clinch nuts for attaching to a metal thinplate automatically to a bonding machine such as a spot welding machine or an automatic crimping machine, and more particularly to a nut supply apparatus to a bonding machine suited to supply of welding nuts and clinch nuts of very small diameter, especially nominal size of about M1.6, securely and automatically.

BACKGROUND ART

In a prior art of a nut supply apparatus to a spot welding machine, for example, a nut send-out port is provided at a terminal end of a supply chute inclined downward so that a plurality of nuts may be supplied continuously in parallel in a same direction, at a front end of a guide rod disposed movably back and forth in an oblique downward direction while intersecting with the nut send-out port, and a holding pin for piercing and holding through the nuts is protruded while penetrating through screw holes of the nuts supported at the nut send-out port, and when the guide rod moves forward in an oblique downward direction, and the leading end of the holding pin approaches and moves to a bonding position of a bonding machine, the nuts held on the holding pin are supplied by fitting with a positioning pin provided at the bonding position (see Patent Literature 1, 2).

Applications of the weld nuts supplied by this conventional nut supply apparatus are mainly in the automobile industrial fields, and the nominal size of nuts was mainly in a range of M6 to M12. Accordingly, the diameter of the holding pin for holding the nuts by penetrating through the screw holes of the nuts was relatively large, and there was no problem in fitting of the nuts with the positioning pin due to fluctuations of the leading end of the holding pin.

However, when the nominal size of the nuts to be supplied is as small as about M1.6, the hole diameter of the screw hole is as small as about 1.0 mm, the holding pin is also thin, fitting of the nuts with the positioning pin at the welding machine side may be difficult due to fluctuations of the leading end of the holding pin. Since this type of the nut supply apparatus is, moreover, mounted on a stand installed near the welding machine, if vibrations in the factory are transmitted to the welding machine side or the stand side, the leading end of the holding pin may fluctuate slightly due to the vibrations, and it may cause a problem in fitting of the nuts with the positioning pin due to fluctuations of the leading end of the holding pin.

SUMMARY OF THE INVENTION

Technical Problem

It is hence an object of the present invention to solve the above problems by preventing effectively fluctuations of the leading end of the holding pin, and to present a nut supply apparatus to a bonding machine capable of fitting the nuts held on the holding pin securely to the positioning pin of a bonding machine such as a welding machine.

Solution to Problem

To solve the above problems, the present invention relates to a nut supply apparatus to a bonding machine including a nut send-out port provided at a terminal end of a supply chute inclined downward so that a plurality of nuts may be supplied continuously in parallel in a same direction, and a holding pin for piercing and holding through the nuts protruded at a front end of a guide rod disposed movably back and forth in an oblique downward direction while intersecting with the nut send-out port, by penetrating through screw holes of the nuts supported at the nut send-out port, in which when the guide rod moves forward in an oblique downward direction, and the leading end of the holding pin approaches and moves to a bonding position of the bonding machine, the nuts held on the holding pin are supplied by fitting with a positioning pin provided at the bonding position, the supply chute is composed of an inclined chute inclined obliquely downward, having a nut send-in port at its upper end for sending in the bonding side of the nuts in an upward position, and a curved chute coupled to the lower end of the inclined chute and curved like an arc obliquely downward, a nut support mechanism is disposed at the nut send-out port disposed at a terminal end of the curved chute, for supporting the nuts being forwarded so that their bonding side may be in an oblique downward position nearly orthogonal to the axial line of the guide rod, and the inclined chute, the curved chute, the guide rod, and driving means for moving the guide rod back and forth in an oblique downward direction are mounted on a stand installed rotatably on a support member by way of a horizontal support shaft, the support member is coupled and fixed to the bonding machine, and when the guide rod forwards obliquely downward, the holding pin penetrates through the screw holes of the nuts supported on the support mechanism, and pieces through and holds the nuts, the leading end of the holding pin approaches and moves to the leading end of the positioning pin, and the screw holes of the nuts held on the holding pin are supplied in fitting with the positioning pin.

In the invention as set forth in claim 2, the guide rod and the driving means for moving the guide rod back and forth obliquely downward are mounted on the stand, and the inclined chute and the curved chute are mounted rotatably on the stand by way of a second horizontal support shaft.

In the invention as set forth in claim 3, the nut support mechanism is provided with a pair of detent pawls to be opened and closed for supporting the nuts at a specified position.

In the invention as set forth in claim 4, the driving means of the guide rod is an air cylinder, and the forwarding position of the guide rod in an oblique downward direction is defined by a stopper protruded on the guide rod by abutting against the stand, and is adjusted to approach and move exactly at the leading end of the positioning pin of the bonding machine at the leading end of the holding pin protruded at the front end of the guide rod.

In the invention as set forth in claim 5, a nut passing groove of the inclined chute is opened and provided at the upper side, so that the nuts positioned in the nut passing groove may be seen through.

Advantageous Effects of Invention

In the nut supply apparatus of the present invention, since the supply chute of nuts is composed of an inclined chute inclined obliquely downward, having a nut send-in port at its upper end for sending in the bonding side of the nuts in an upward position, and a curved chute coupled to the lower end of the inclined chute and curved like an arc obliquely downward, the curved chute can be disposed closely to the bonding position without interfering with the action of the bonding machine, and the spacing distance from the nut send-out port provided at the terminal end of the curved chute to the positioning pin provided at the bonding position can be shortened to a minimum limit, and the forward moving distance of the guide rod can be shortened, and thereby it is effective to prevent fluctuations of the leading end of the thin holding pin protruded at the front end of the guide rod, and the stand mounting the inclined chute, the curved chute, the guide rod, and the driving means for moving the guide rod back and forth obliquely downward is coupled and fixed to the bonding machine by way of the support member, and slight displacements of the mutual spacing distance due to vibrations can be prevented, and oscillation due to vibrations of the leading end of the holding pin protruded at the front end of the guide rod can be effectively prevented, so that the nuts held on the holding pin can be securely fitted to the positioning pin.

According to the invention as set forth in claim 2, the position of the nut send-our port provided at the terminal end of the curved chute can be fine adjusted easily to the holding pin, and it is convenient for using and handling.

According to the invention as set forth in claim 3, the foremost nut sent into the nut send-out port can be accurately held at a specified position, and the nut can be held securely by the holding pin.

According to the invention as set forth in claim 4, when an air cylinder is used as driving means of the guide rod, by the stopper fitted to the guide rod, the forward position of the holding pin protruded at the front end of the guide rod can be adjusted correctly.

According to the invention as set forth in claim 5, it is easy to check visually whether the nut sent into the inclined chute is supplied in a correct position or not.

DESCRIPTION OF EMBODIMENTS

Embodiments of the present invention are described specifically below while referring to the accompanying drawings.

[Embodiment 1]

FIG. 1 to FIG. 11 show an embodiment of the nut supply apparatus of the present invention applied in supply of weld nuts in a spot weld machine.

Figure 11:
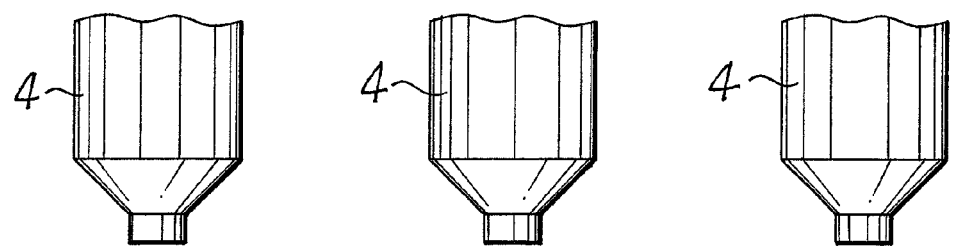
FIG. 11 is an explanatory diagram showing a process of fitting of a weld nut held on a holding pin of the nut supply apparatus of the present invention shown in FIG. 1, with a positioning pin provided at a bonding position of a spot welding machine, in which (*a*) shows a state of the holding pin approaching and moving to the positioning pin, (*b*) shows a state of the nut held on the holding pin fitted to the positioning pin, and (*c*) shows a state of completion of fitting of the nut with the positioning pin.
Figure 11:
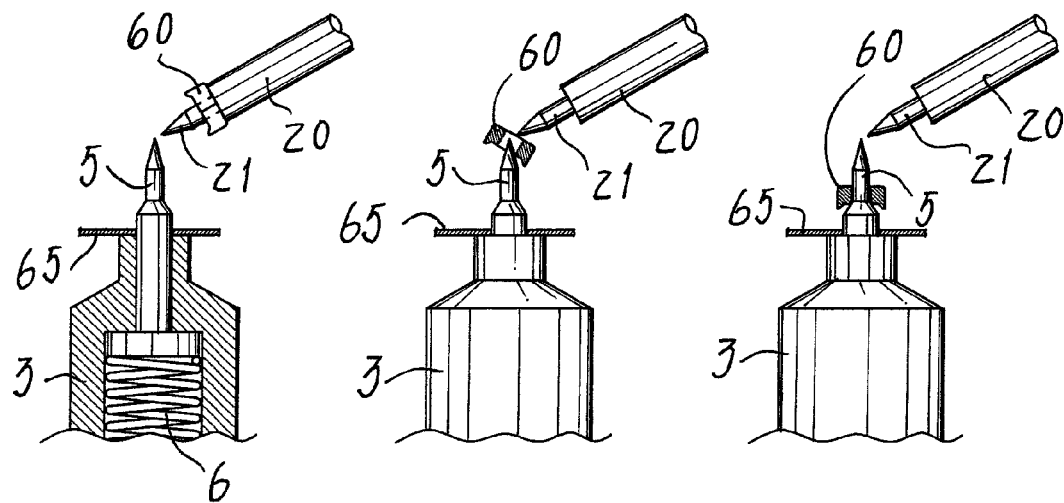

A spot welding machine 1 includes a lower electrode 3 fixed to a support arm 2 of the main body, and an upper electrode 4 disposed oppositely to the lower electrode 3 and moving reciprocally up and down. At the upper end part of the lower electrode 3, a positioning pin 5 is provided for fitting and supporting a weld nut 60 described later. This positioning pin 5 is, as shown in FIG. 11 (*a*), inserted in the lower electrode 3 so as to be movable up and down, and is forced to project upward by force by means of a push spring 6.

The weld nut (hereinafter called nut) 60 is made of stainless steel, and has a very small nominal size of about M1.6, and the inside diameter of its screw hole 61 is very small, about 1.0 mm, and a plurality of welding protrusions 63 are protruded on a bonding side 62 (see FIG. 2 to FIG. 4).

The supply chute 11 forming a principal section of the nut supply apparatus 10 for guiding and supplying the nuts 60 continuously is composed of an inclined chute 12 having a nut send-in port 14 at the upper end and inclined and disposed obliquely downward, and a curved chute 13 coupled to the lower end of the inclined chute 12 and curved like an arc obliquely downward, and a nut send-out port 15 is provided at the terminal end of the curved chute 13.

Figure 2:
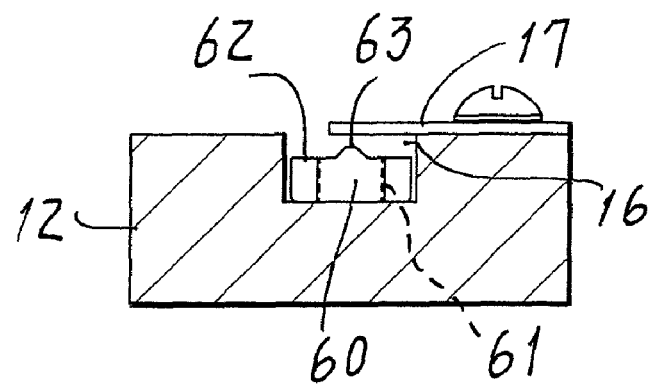
FIG. 2 is a sectional magnified view along line 2-2 in FIG. 1.

The inclined chute 12 is, as shown in FIG. 2, provided with a nut passing groove 16 opened to the upper side, and the nut 60 is supplied continuously from the nut send-in port 14 with its bonding side 62 in an upward position, so that the nut 60 passing in the nut passing groove 16 may be seen through. The opening of the nut passing groove 16 is partly covered with a lid plate 17 to prevent the nut 60 from dropping out of the nut passing groove 16 accidentally.

Figure 3:
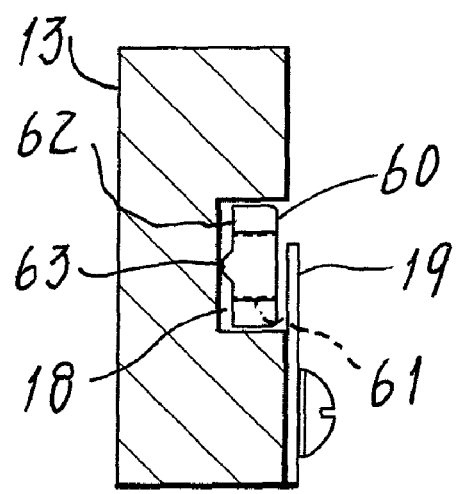
FIG. 3 is a sectional magnified view along line 3-3 in FIG. 1.
Figure 4:
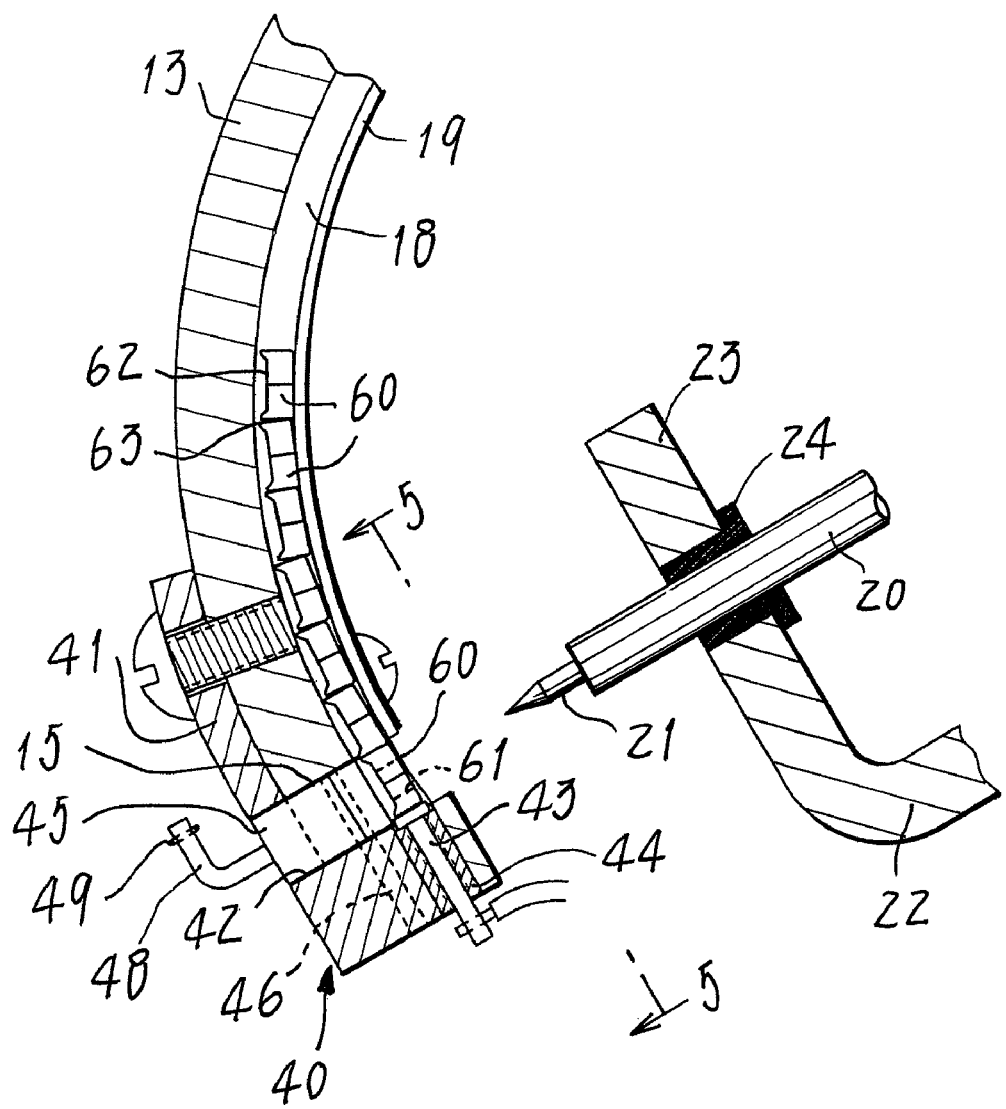
FIG. 4 is a magnified longitudinal sectional view of essential parts in FIG. 1.
Figure 5:
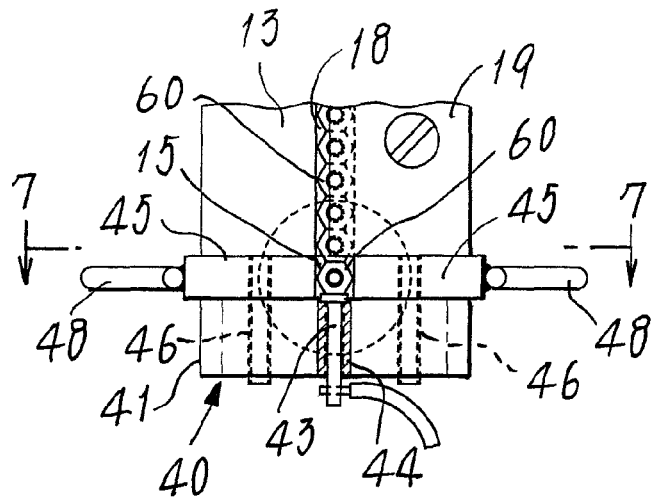
FIG. 5 is an arrow view along line 5-5 in FIG. 4, showing a front view of a nut support mechanism.
Figure 6:
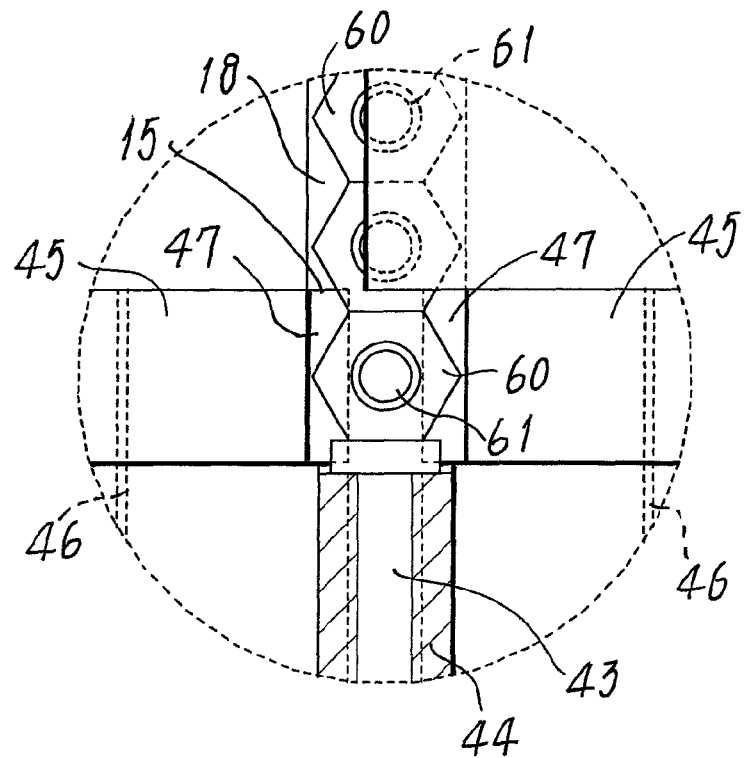
FIG. 6 is a magnified view of a circular portion indicated by a broken line in FIG. 5.

The curved chute 13 is, as shown in FIG. 3, provided with a nut passing groove 18 opened at the lateral side, and the nut 60 sent in through the inclined chute 12 is sent into the nut send-out port 15 while its bonding side 62 is gradually changed in position in an oblique downward position (see FIG. 4). The opening of the nut passing groove 18 is also partly covered with a lid plate 19 to prevent the nut 60 from dropping out of the nut passing groove 18 accidentally.

At the terminal end of the curved chute 13, as described below, a nut support mechanism 40 is provided for supporting the nut 60 sent into the nut send-out port 15 at a specified position.

At the front end of a guide rod 20 intersecting with the nut send-out port 15 and disposed movably back and forth obliquely downward, a holding pin 21 is protruded by penetrating through a screw hole 61 of the nut 60 supported at the nut send-out port 15 for piercing through and holding the nut 60. This guide rod 20 is supported on a front wall plate 23 of a stand 22 by penetrating through slidably in an axial direction by way of a bush 24, and its rear end part is linked and coupled to a piston rod 26 of an air cylinder 25 fixed in a rear of the stand 22 by way of an adjusting connector 27, and is moved reciprocally in an axial direction by the air cylinder 25. A stopper 28 inserted in the rear end part of the guide rod 20 abuts against the front wall plate 23 of the stand 22 when the guide rod 20 moves forward, and the forward position of the guide rod 20 is defined accurately. The stand 22 is provided with a bracket 29 in an upright position for supporting the inclined chute 12 and the curved chute 13.

In the inclined chute 12 and the curved chute 13, a support bracket 30 mounted and fixed at an intermediate position of the inclined chute 12 is coupled and supported to the bracket 29 by way of a bolt-nut 31 serving also as a horizontal support shaft, and is mounted on the stand 22 rotatably on the fulcrum of the bolt-nut (second horizontal support shaft) 31, and the position of the nut send-out port 15 provided at the terminal end of the curved chute 13 may be easily adjusted finely to the holding pin 21 at the front end of the guide rod 20. On the stand 22, a support bracket 32 for supporting on a support member 33 is also mounted and fixed.

The support member 33 is provided with a bracket 34 for supporting the stand 22 in an upright position, and the support bracket 32 of the stand 22 is coupled and supported to the bracket 34 by way of a bolt-nut 35 serving also as a horizontal support shaft, and the stand 22 is mounted on the support member 33 rotatably on the fulcrum of the bolt-nut (first horizontal support shaft) 35.

The support member 33 is mounted and fixed on the support arm 2 of the spot welding machine 1 by way of a clamp 36. Therefore, the stand 22 for mounting the inclined chute 12, the curved chute 13, the guide rod 20, and the air cylinder 25 as its driving means is directly coupled and fixed to the spot welding machine 1 by way of the support member 33. By rotating and adjusting the stand 22 on the fulcrum of the bolt-nut 35 serving as the first horizontal support shaft, when the guide rod 20 moved forward, the leading end of the holding pin 21 can be approached and moved precisely to the leading end of the positioning pin 5.

Figure 7:
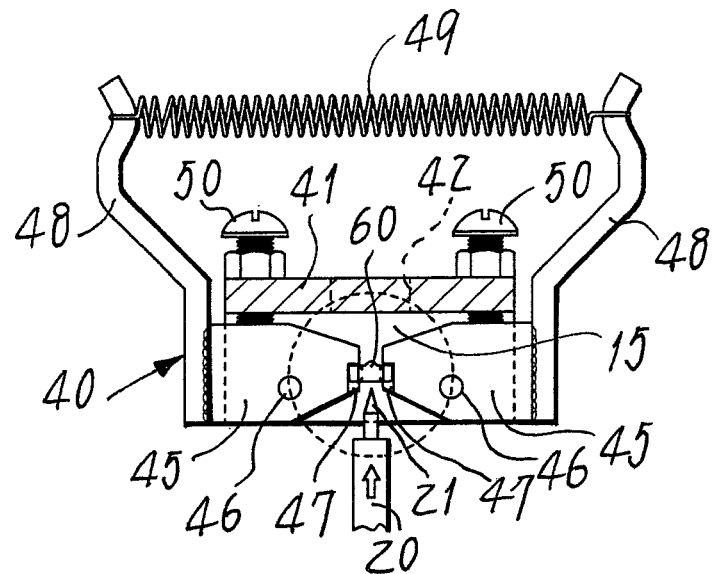
FIG. 7 is an arrow view along line 7-7 in FIG. 5, showing a plan view of a nut support mechanism.
Figure 8:
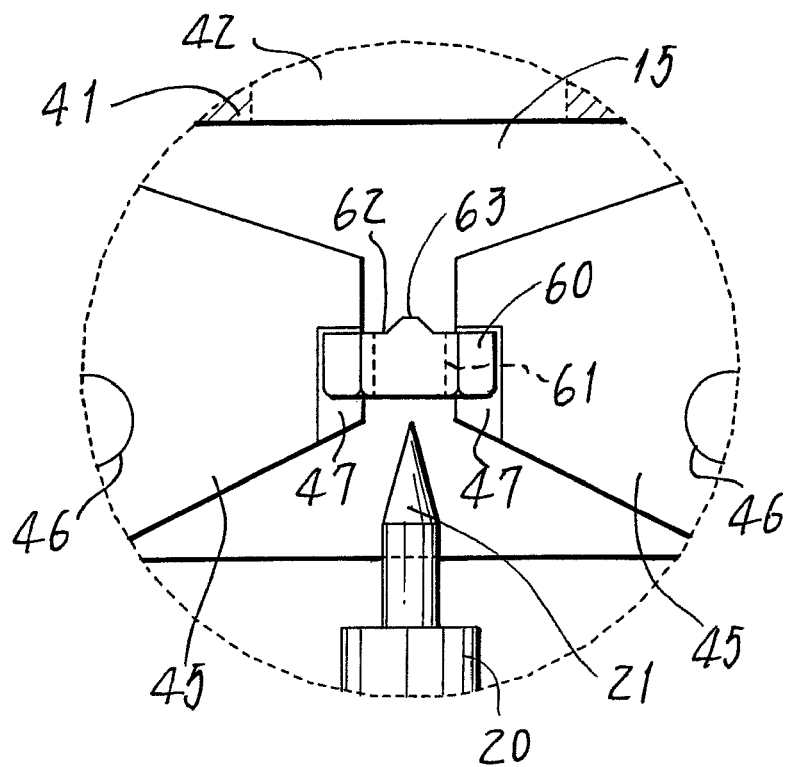
FIG. 8 is a magnified view of a circular portion indicated by a broken line in FIG. 7.

The nut support mechanism 40 provided at the terminal end part of the curved chute 13 is explained by referring to FIG. 4 to FIG. 10. The nut support mechanism 40 is fixed to the terminal end part of the curved chute 13, and includes an L-shaped mounting bracket 41 for covering the bottom side of the nut send-out port 15. The mounting bracket 41 is provided with a through-hole 42 (see FIG. 4) matching with the nut send-out port 15. In the bottom of the mounting bracket 41, a touch sensor 43 is inserted by way of an insulator 44, and the foremost nut 60 sent into the nut send-out port 15 abuts against the touch sensor 43, and is detected, and is supported in contact state. Further, the mounting bracket 41 is provided with a pair of detent pawls 45, 45 disposed at both sides of the nut send-out port 15, rotatably by way of pivot pins 46, 46. The both detent pawls 45, 45 are tapered in the mutually opposite front parts, and detent recesses 47, 47 for supporting by mutually engaging the both side parts of the nut 60 positioned at the nut send-out port 15 are disposed oppositely. At the outer side ends of the both detent pawls 45, 45, arms 48, 48 extending forward are fixed, and by a tension spring 49 applied on the both arms 48, 48, as shown in FIG. 7 and FIG. 8, the front ends of the both detent pawls 45, 45 are forced at a mutually opposing and approaching closing position. In the diagram, reference numerals 50, 50 are stopper pins for defining the both detent pawls 45, 45 so as to stop at the abutting closing position, and are fixed on the mounting bracket 41 as adjusting screw pins.

Figure 9:
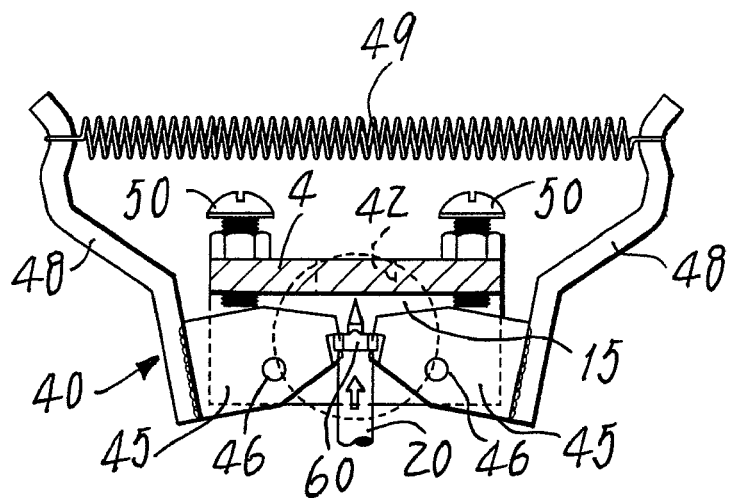
FIG. 9 is a plan view showing an operating state of the nut support mechanism.
Figure 10:
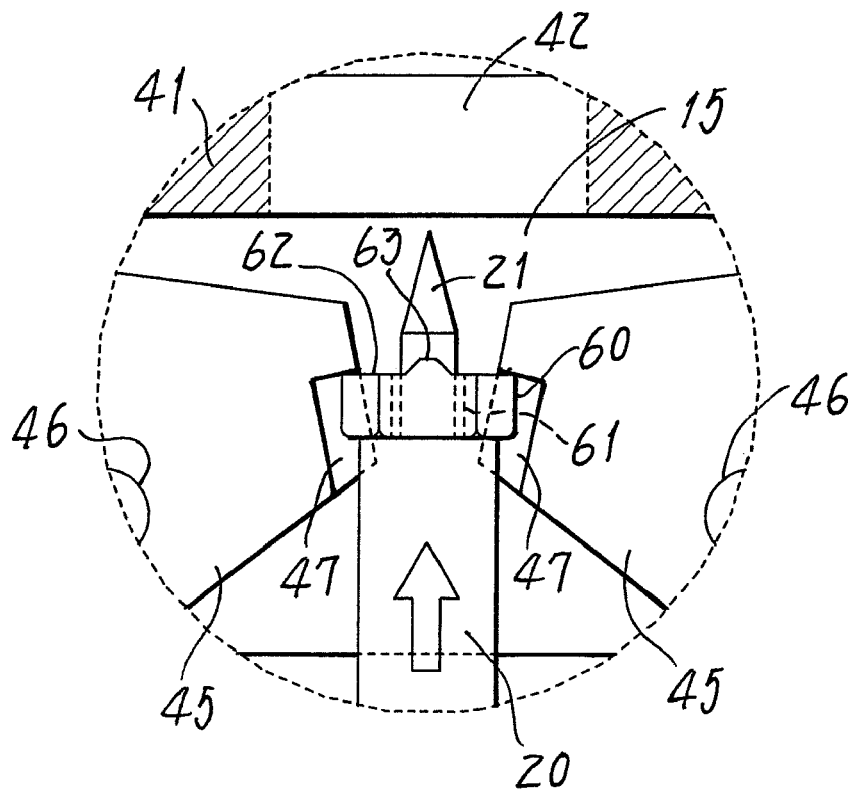
FIG. 10 is a magnified view of a circular portion indicated by a broken line in FIG. 9.

When the both detent pawls 45, 45 are at the closing position, the both side parts of the nut 60 sent into the nut send-out port 15 and supported in contact with the touch sensor 43 are engaged with the detent recesses 47, 47, thereby preventing the nut 60 from dropping out of the nut send-out port 15. On the other hand, when the guide rod 20 moves forward obliquely downward, the holding pin 21 protruded at the front end penetrates through the screw hole 61 of the nut 60 supported at the nut send-out port 15, and pierces through and holds the nut 60, and by moving forward, as shown in FIG. 9 and FIG. 10, the both detent pawls 45, 45 are pushed and opened by overcoming the tension spring 49, by the nut 60 held on the holding pin 21, and the nut is pushed out of the curved chute 13 by way of the through-hole 42. When the guide rod 20 further moves forward obliquely downward, as shown in FIG. 11, the leading end of the holding pin 21 approaches the leading end of the positioning pin 5 of the spot welding machine 1, and the guide rod 20 stops (see FIG. 11 (a)). In succession, as shown in FIG. 11 (b), the nut 60 held on the holding pin 21 drops and moves by the own weight together with an inertial force, and is supplied with its screw hole 61 fitting with the positioning pin 5.

Figure 1:
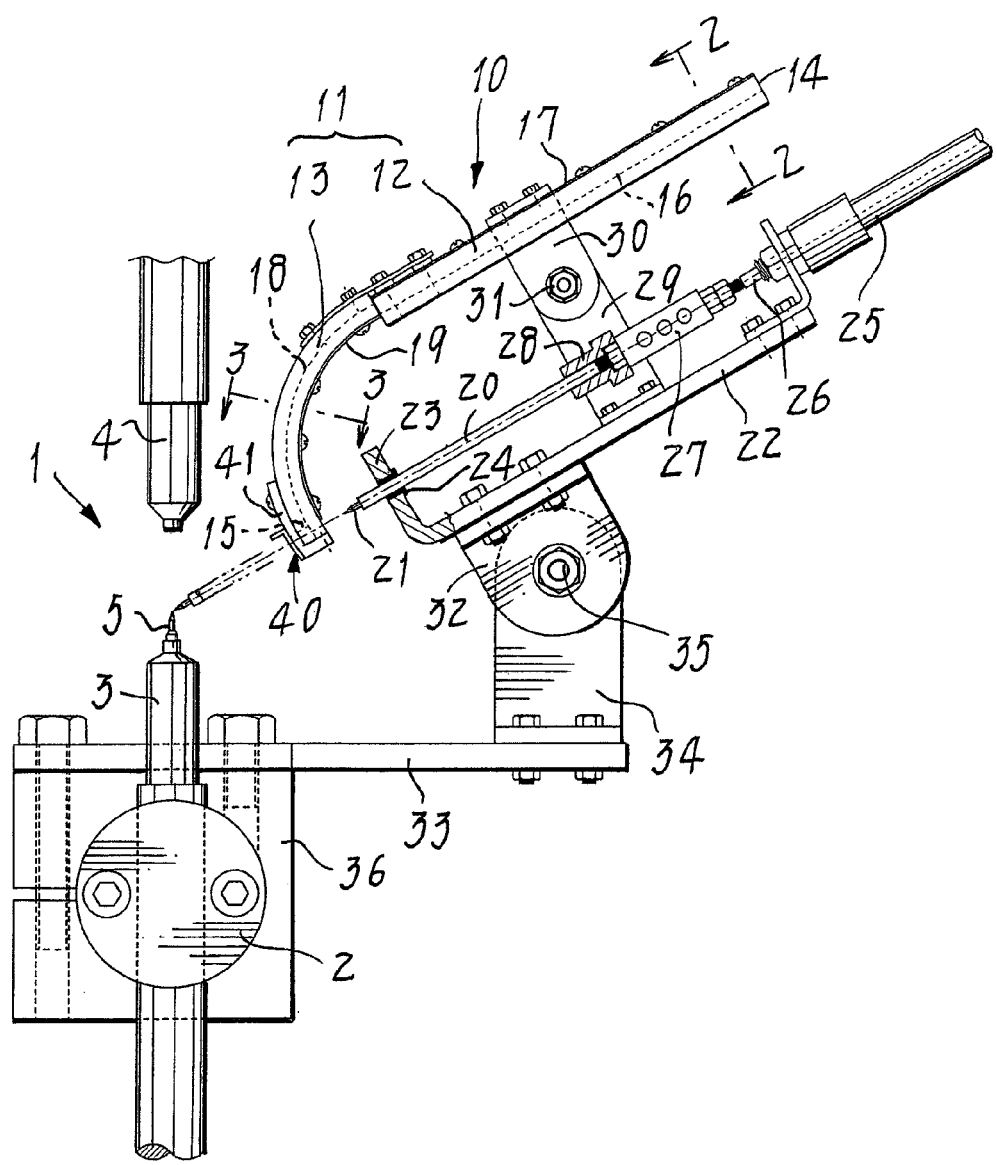
FIG. 1 is a partially cut-away front view showing embodiment 1 of a nut supply apparatus of the present invention applied in a spot welding machine.

Afterwards, the guide rod 20 moves backward to the position indicated by solid line in FIG. 1 and FIG. 4, and stops, and waits for supply of a next nut.

On the other hand, as shown in FIG. 11 (c), when the nut 60 is fitted to the positioning pin 5, the upper electrode 4 descends, and pushes down the nut 60 together with the positioning pin 5, and the nut 60 is pressed to a metal thin plate 65 mounted on the lower electrode 3 preliminarily fitted to the positioning pin 5, and power is supplied in this state, and a welding protrusion 63 is fused, and the nut 60 is welded to the metal thin plate 65.

[Embodiment 2]

Figure 12:
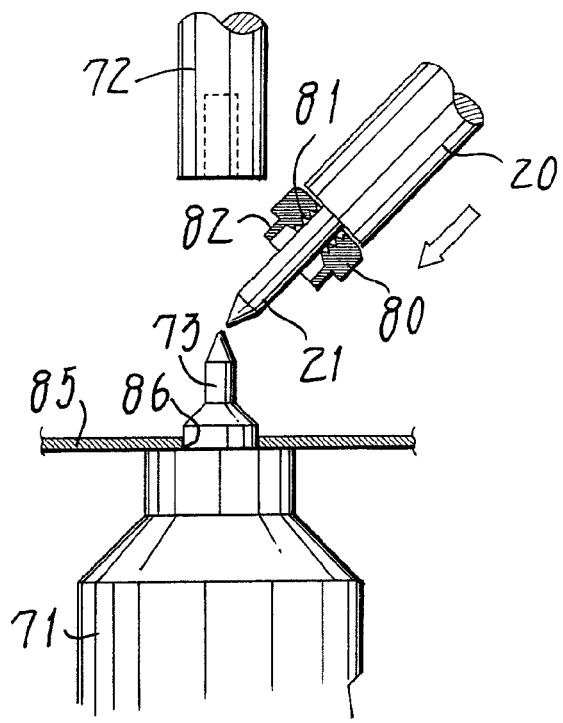
FIG. 12 is an explanatory diagram showing a state of a holding pin approaching and moving to a positioning pin in embodiment 2 of the nut supply apparatus of the present invention applied in supply of clinch nuts to an automatic crimping machine.
Figure 13:
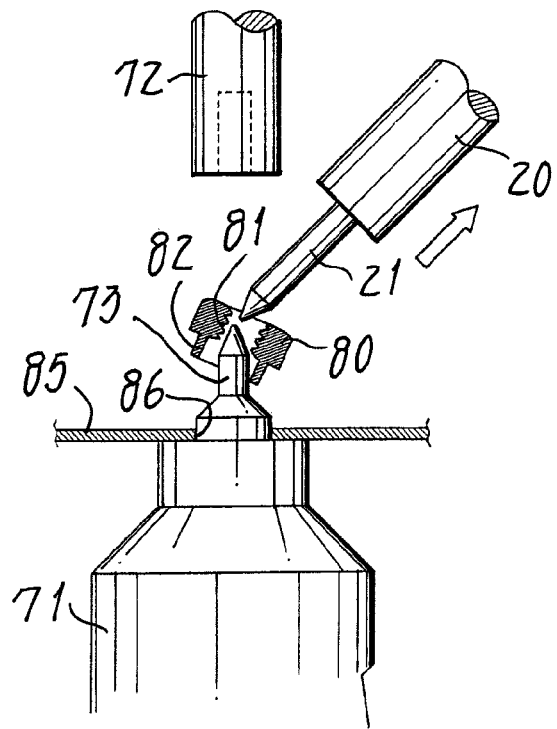
FIG. 13 is an explanatory diagram showing a state of clinch nuts held on the holding pin fitted to a positioning pin.
Figure 14:
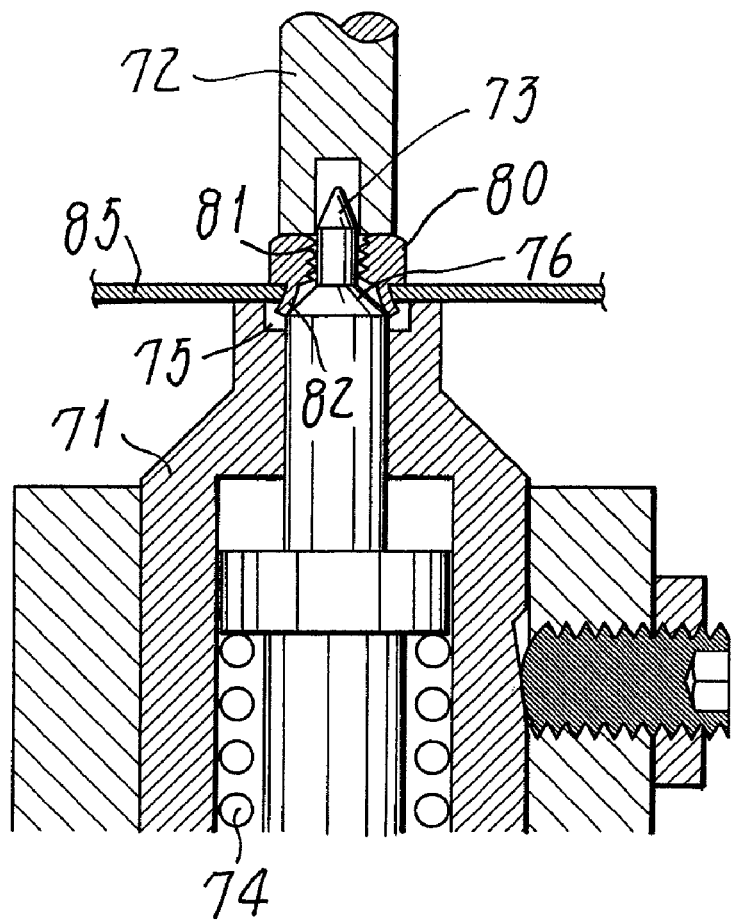
FIG. 14 is an explanatory diagram showing a crimping process of crimping the clinch nuts fitted to the positioning pin and affixing to a metal thin plate.

FIG. 12 to FIG. 14 show other embodiment of the nut supply apparatus of the present invention applied in supply of clinch nuts 80 in an automatic crimping machine. The configuration of the nut supply apparatus is same as in embodiment 1, and the explanation is omitted.

FIG. 12 shows principal components of the automatic crimping machine, that is, a crimping die 71, and a crimping punch 72, disposed oppositely above the crimping die 71, and moved up and down by a press or other machine. In the crimping die 71, a positioning pin 73 is inserted slidably up and down. The positioning pin 73 is forced upward by a push spring 74 inserted in the crimping die 71 as shown in FIG. 14.

At the upper end side of the crimping die 71, a crimping recess 75 is provided.

The clinch nut 80 is made of stainless steel, and at the tightening seat side, a crimping cylindrical part 82 is protruded concentrically with a screw hole 81, and this is a very small screw with a screw nominal size of about M1.6.

As shown in FIG. 12, when the guide rod 20 moves forward obliquely downward, and the holding pin 21 penetrating through the screw hole 81 of the clinch nut 80 and piercing through and holding the clinch nut 80 approaches the leading end of the positioning pin 73 and stops, the clinch nut 80 held on the holding pin 21 drops and moves by the own weight together with an inertial force, and it is supplied, as shown in FIG. 13, while the screw hole 81 is fitted with the positioning pin 73 from the side of the crimping cylindrical part 82. In succession, the guide rod 20 moves backward to a waiting position.

On the other hand, on the positioning pin 73, preliminarily, a metal thin plate 85 is mounted on the upper end face of the crimping die 71 by fitting with a mounting hole 86 provided in the metal thin plate 85, and as shown in FIG. 14, the crimping punch 72 descends to push down the clinch nut 80 together with the positioning pin 73, and the crimping cylindrical part 82 of the clinch nut 80 penetrates through the mounting hole 86, and further the clinch nut 80 is pressed by the crimping punch 72, and the crimping cylindrical part 82 is crimped and deformed in a radial direction by a conical trapezoidal side face 76 spreading downward of the positioning pin 73, and the clinch nut 80 is crimped and coupled to the metal thin plate 85.

[Industrial Applicability]

The present invention is suited to supply of welding nuts or clinch nuts of very small size of nominal size of about M1.6, to a bonding machine, such as spot welding machine or automatic crimping machine.

[Reference Signs List]
1 Spot welding machine
2 Support arm
3 Lower electrode
4 Upper electrode
5 Positioning pin
10 Nut supply apparatus
11 Supply chute
12 Inclined chute
13 Curved chute
14 Nut send-in port
15 Nut send-out port
16, 18 Nut passing groove
17, 19 Lid plate
20 Guide rod
21 Holding pin
22 Stand
23 Front wall plate
25 Air cylinder
28 Stopper
29 Bracket
30 Support bracket
31 Bolt-nut (second horizontal support shaft)
32 Support bracket
33 Support member
34 Bracket
35 Bolt-nut (first horizontal support shaft)
36 Clamp
40 Nut support mechanism
41 Mounting bracket
42 Through-hole
43 Touch sensor
45 Detent pawl
46 Pivot pin
47 Detent recess
48 Arm
49 Tension spring
50 Stopper pin
60 Weld nut (nut)
61 Screw hole
62 Bonding side
63 Welding protrusion
65 Metal thin plate
71 Crimping die
72 Crimping punch
73 Positioning pin
80 Clinch nut
81 Screw hole
82 Crimping cylindrical part
85 Metal thin plate

[Citation List]
[Patent Literature]
PTL1: Japanese Patent Application Publication No. 47-41655
PTL2: Japanese Utility Model Application Laid-Open No. 49-30534

The invention claimed is:

1. A nut supply apparatus to a bonding machine comprising a nut send-out port provided at a terminal end of a supply chute inclined downward so that a plurality of nuts may be supplied continuously in parallel in a same direction, and a holding pin for piercing and holding through the nuts protruded at a front end of a guide rod disposed movably back and forth in an oblique downward direction while intersecting with the nut send-out port, by penetrating through screw holes of the nuts supported at the nut send-out port, wherein when the guide rod moves forward in an oblique downward direction, and the leading end of the holding pin approaches and moves to a bonding position of the bonding machine, the nuts held on the holding pin are supplied by fitting with a positioning pin provided at the bonding position, the supply chute is composed of an inclined chute inclined obliquely downward, having a nut send-in port at its upper end for sending in the bonding side of the nuts in an upward position, and a curved chute coupled to the lower end of the inclined chute and curved like an arc obliquely downward, a nut support mechanism is disposed at the nut send-out port disposed at a terminal end of the curved chute, for supporting the nuts being forwarded so that their bonding side may be in an oblique downward position nearly orthogonal to the axial line of the guide rod, and the inclined chute, the curved chute, the guide rod, and driving means for moving the guide rod back and forth in an oblique downward direction are mounted on a stand installed rotatably on a support member by way of a horizontal support shaft, the support member is coupled and fixed to the bonding machine, and when the guide rod moves forward obliquely downward, the holding pin penetrates through the screw holes of the nuts supported on the support mechanism, and pieces through and holds the nuts, the leading end of the holding pin approaches and moves to the leading end of the positioning pin, and the screw holes of the nuts held on the holding pin are supplied in fitting with the positioning pin.

2. The nut supply apparatus to the bonding machine of claim 1, wherein the guide rod and the driving means for moving the guide rod back and forth obliquely downward are mounted on the stand, and the inclined chute and the curved chute are mounted rotatably on the stand by way of a second horizontal support shaft.

3. The nut supply apparatus to the bonding machine of claim 1, wherein the nut support mechanism is provided with a pair of detent pawls to be opened and closed for supporting the nuts at a specified position.

4. The nut supply apparatus to the bonding machine of claim 1, wherein the driving means of the guide rod is an air cylinder, and the forwarding position of the guide rod in an oblique downward direction is defined by a stopper protruded on the guide rod by abutting against the stand, and is adjusted to approach and move exactly at the leading end of the positioning pin of the bonding machine at the leading end of the holding pin protruded at the front end of the guide rod.

5. The nut supply apparatus to the bonding machine of claim 1, wherein a nut passing groove of the inclined chute is opened and provided at the upper side, so that the nuts positioned in the nut passing groove may be seen through.

6. The nut supply apparatus to the bonding machine of claim 1, wherein the bonding machine is a spot welding machine.

7. The nut supply apparatus to the bonding machine of claim 1, wherein the bonding machine is an automatic crimping machine of clinch nuts.

* * * * *